United States Patent [19]

Pun et al.

[11] 4,027,078

[45] May 31, 1977

[54] LEAK-RESISTANT DRY CELLS

[76] Inventors: Ching W. Pun; Ching C. Poon, both of Villa Viva, To Fung Shan Road, Shatin, New Territory, Kowloon, Hong Kong

[22] Filed: Oct. 16, 1975

[21] Appl. No.: 623,111

[30] Foreign Application Priority Data

Oct. 17, 1974 United Kingdom ............ 45042/74

[52] U.S. Cl. .................................. 429/166; 429/185
[51] Int. Cl.² ......................................... H01M 6/00
[58] Field of Search .......... 136/107, 111, 128, 129, 136/132, 133, 135 R, 163, 169, 175; 429/164, 166, 167, 168, 171, 174, 185, 178, 181

[56] References Cited

UNITED STATES PATENTS

| 1,205,392 | 11/1916 | Rhoades | 136/128 |
| 2,200,862 | 5/1940 | Redfern | 136/107 |
| 3,437,530 | 4/1969 | Anderson | 136/132 |
| 3,623,915 | 11/1971 | Pun et al. | 136/133 |
| 3,795,545 | 3/1974 | Kamai | 136/107 |

FOREIGN PATENTS OR APPLICATIONS

| 573,582 | 11/1945 | United Kingdom |
| 704,710 | 2/1954 | United Kingdom |

Primary Examiner—Anthony Skapars
Attorney, Agent, or Firm—Bacon & Thomas

[57] ABSTRACT

A leak-resistant dry cell comprises a negative electrode formed by a zinc tube which is designed to be consumed when the cell voltage has fallen to e.g. 0.75 volt, a sealed bag of flexible plastics material enclosing said zinc tube and surrounded by a cylindrical jacket, a carbon positive electrode projecting through said bag and sealed thereto, and a tongue extending from the edge of the sidewall of the zinc tube through said bag in sealing relationship therewith, the tongue contacting a negative terminal of the cell.

7 Claims, 7 Drawing Figures

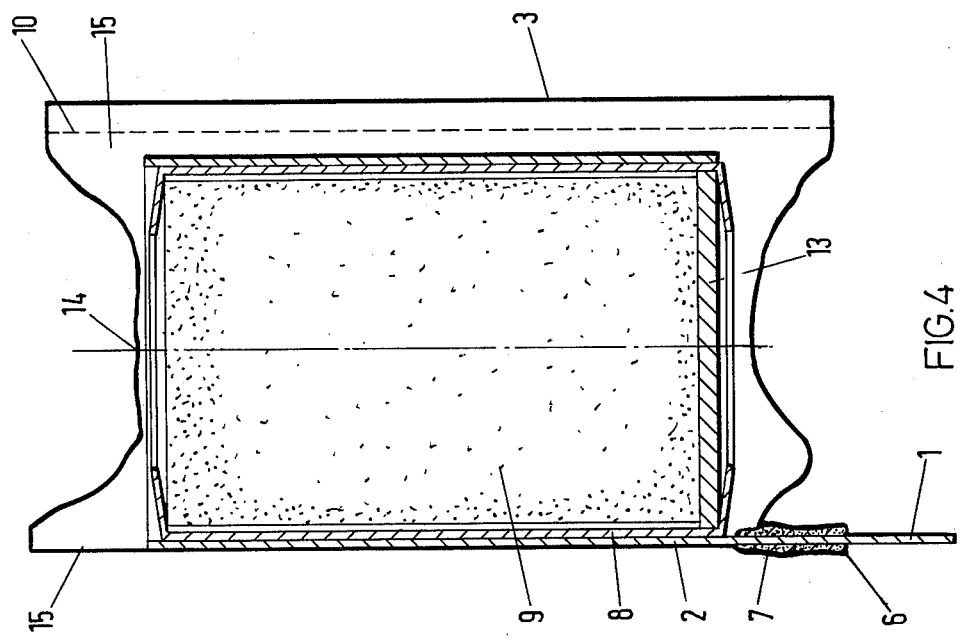
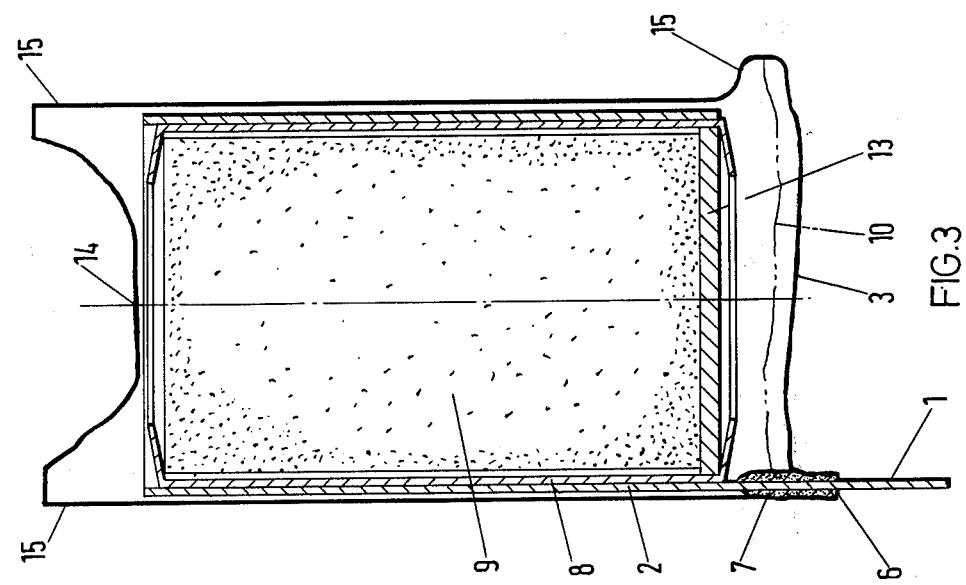

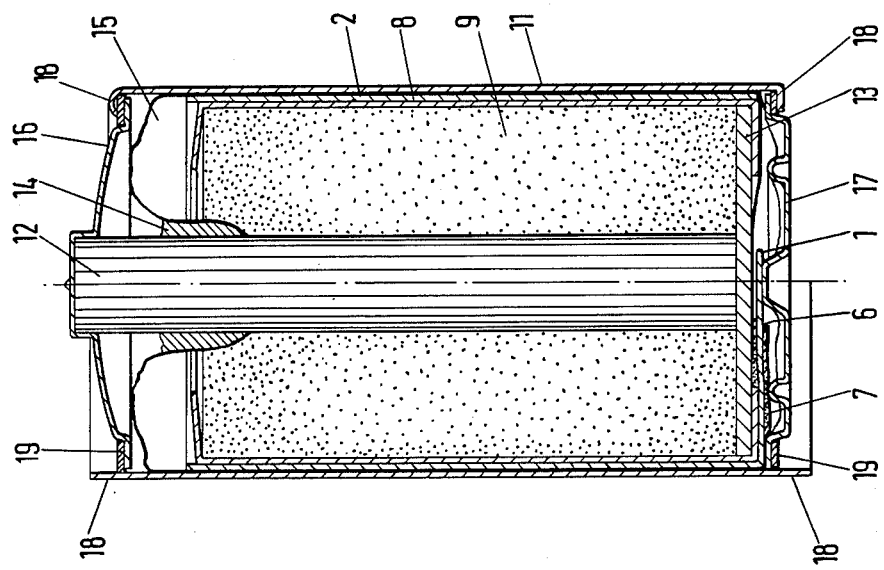
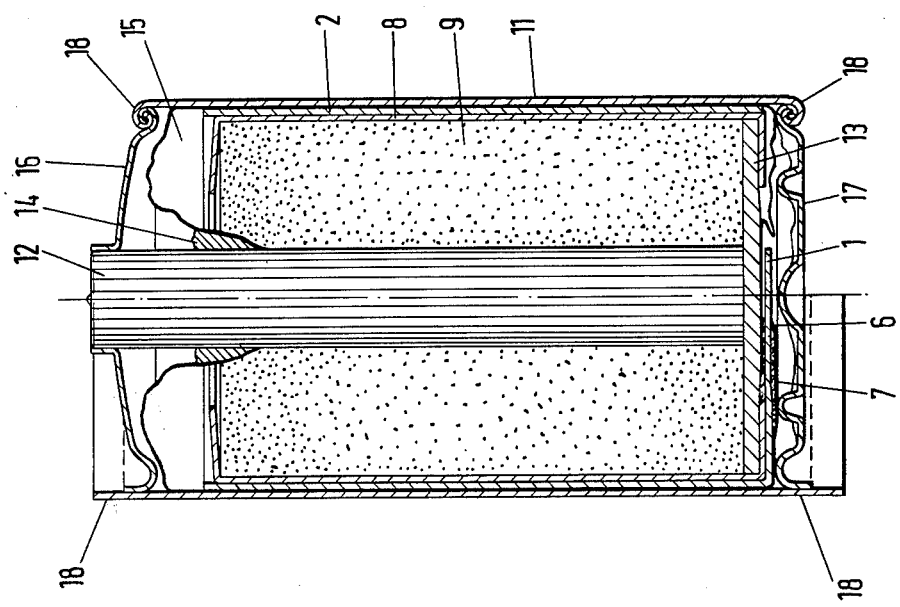

LEAK-RESISTANT DRY CELLS

The present invention is concerned with leak-resistant dry Leclanche cells, and more particularly to dry cells of the cylindrical type having a reduced zinc content compared to conventional dry cells.

It is well known that leakage of dry cells near or after the end of their useful life is objectionable, and various proposals have been put forward to control such leakage. These proposals, although sometimes quite effective, have been costly to implement.

Leakage becomes a major problem when attempts are made to reduce the zinc content of a dry cell, since it is then to be expected that the zinc negative electrode (properly termed the anode where a primary cell is concerned) will be extensively perforated by the time that the cell is exhausted. On the other hand a reduction in the zinc content does have the advantage that when the zinc is used up electrochemical reactions in the cell virtually cease, and hence the production of corrosive liquid within the exhausted cell is much reduced. It will be appreciated that any excess of zinc left in a cell when its voltage has dropped below a minimum acceptable value, e.g. 0.75 volt, has no actual use. If the circuit is still switched on or there is a short circuit, this excess of zinc can still undergo electrochemical reaction inside the cell until all the zinc is consumed, the result being the exuding of a large quantity of liquid. If the amount of zinc is controlled so that it will be substantially used up when the voltage of the cell reaches e.g. 0.75 volt, the electrochemical reaction drops to zero rapidly and thus no more liquid will be generated.

When we control the amount of zinc used, we have to make the zinc electrode very thin since the amount of zinc used is small. When the terminal voltage has dropped to around 1 volt, there is not much zinc left in the zinc electrode. In fact at this time the jacket of the cell is in contact with the electrolyte. Therefore the jacket must be made with material which can withstand the corrosive liquid of the electrolyte. Self-corrosion of the zinc electrode occurs in a lot of cells before their usage and leakage also occurs before actual usage. If a cell is to utilise a thin zinc electrode, than a corrosion-proof jacket is essential.

If the zinc electrode is made very thin, then there will be a problem of keeping the remainder of the zinc in position and in good contact with the electrolyte when it is almost used up. Before the zinc electrode is mostly used up, there will be some liquid exuded and therefore the jacket must have enough internal space to contain this liquid. The internal pressure will also increase and the outer jacket must stand this high internal pressure for a long time.

Our invention is based on the realisation that a leak-resistant dry cell of reduced zinc content can advantageously incorporate a soft plastics bag to control leakage and thus avoid damaging appliances of high value in which the battery may be placed.

One aspect of our invention provides a dry cell comprising a negative electrode formed by a zinc tube which is open at both ends and is so dimensioned that it is substantially totally consumed when the cell voltage has fallen to a predetermined minimum value e.g. in the range 0.70 to 0.85 volt, a sealed bag of flexible plastics material enclosing said zinc tube and surrounded by a cylindrical jacket, a carbon positive electrode (properly termed a cathode in connection with a primary cell) projecting through said bag in sealing relation thereto, and at least one tongue extending from said zinc tube through said bag in sealing relation thereto into contact with a negative terminal of the cell.

In order to conserve zinc, the height of the zinc tube will generally be substantially the same as that of the depolarising dolly within the cell. The jacket may be of any suitable material, e.g. metal, paper, or cardboard; the base of the cell will ordinarily comprise a metal negative terminal which may be attached to the cylindrical jacket. The carbon electrode and the tongue extending from the zinc tube must form a seal with the bag effective to prevent passage of liquid during storage and use of the cell. Suitable sealing materials, as mentioned hereinafter, may be used to ensure this.

According to a further aspect of our invention the above-defined dry cell may be made by a process comprising the steps of sealing said zinc tube containing a dolly and electrolyte in a bag of flexible plastics material, surrounding said bag by said cylindrical jacket and inserting a carbon electrode into said dolly through said bag. The advantages of constructing the cell in this way will be described hereinafter.

Although it is possible to insert the dolly and electrolyte into a preformed zinc tube, we prefer to form the tube from zinc sheet around the dolly and electrolyte; this is operationally convenient and results in excellent contact between the zinc electrode and the electrolyte. This method is particularly preferable in the production of paperlined cells. If the zinc tube is formed by rolling up a zinc sheet, the longitudinal or helical line of abutment need not be closed by soldering or welding, since the plastics bag will prevent leakage or drying up of the electrolyte. The tongue projecting from the zinc tube may be integral or may be attached thereto in electrically conductive manner.

The bag of flexible plastics material is preferably of polyolefin material such as polyethylene or polypropylene or of vinyl material such as PVC. It may incorporate an aperture to admit the tongue projecting from the zinc tube or the tongue may pierce an aperture when the tube, dolly and electrolyte assembly is placed in the plastics bag. The bag may be preformed and the tube, dolly and electrolyte assembly placed therein or the bag may be formed around said assembly, e.g. by sealing both ends of a length of plastics tubing.

Two embodiments of our invention will now be described by way of example only with reference to the accompanying drawings, wherein:

FIG. 3 shows a cross-sectional elevational view of the plastics bag of FIG. 1 enclosing the depolarizing mix, electrolyte in the form of electrolytic paste lined paper and the zinc electrode. The bag is already sealed.

Figure 2:
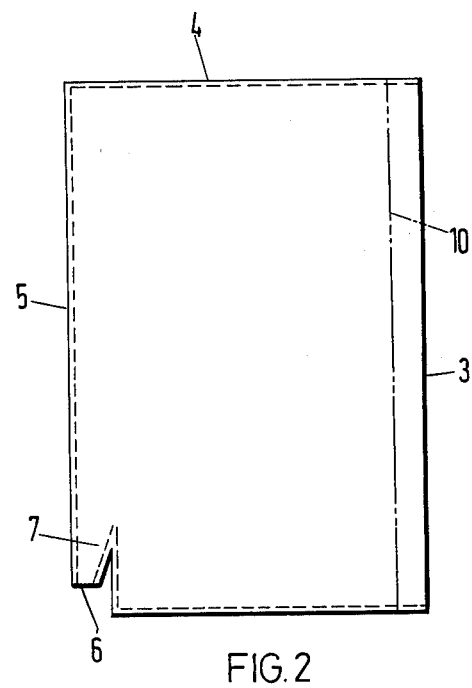
FIG. 2 shows an elevational view of another type of flexible plastics bag with a lateral opening facing sideways (as drawn).

FIG. 4 corresponds to FIG. 3 except that the bag of FIG. 2 has been employed.

FIG. 5 shows a cross-sectional elevational view of a completed cell surrounded by a paper jacket.

FIG. 6 shows a cross-sectional elevational view of a completed cell surrounded by a metal outer jacket.

In the embodiments illustrated the zinc electrode contains a controlled amount of zinc which will be substantially used up when the voltage of the cell has dropped to below about 0.75 volts. Then the only liquid exuded inside the cell is formed before this stage, and very little is formed after this stage. The amount of liquid exuded is limited and therefore leakproofing can easily be done.

Figure 1:
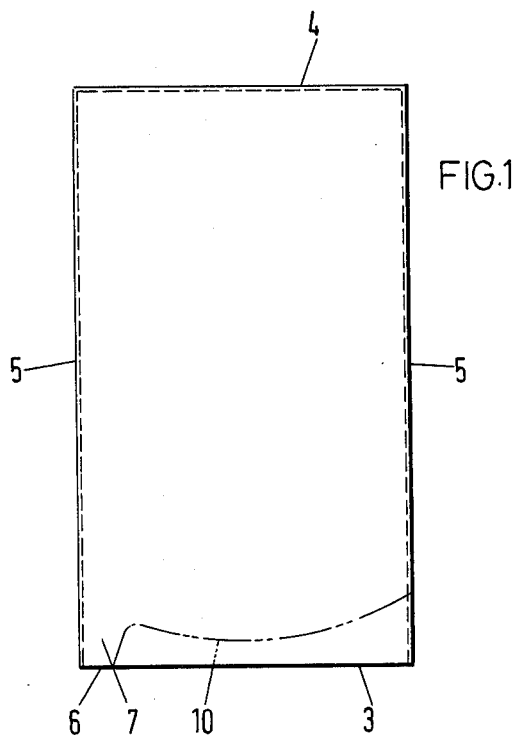
FIG. 1 shows an elevational view of a flexible plastics bag suitable for use in this invention with its opening at the bottom (as drawn).

In all the figures 1 is the zinc tongue which extends from the thin zinc electrode for the purpose of conductivity. The zinc electrode in conventional cells is large in area and in volume and is hard to wrap and seal, but with a narrow zinc tongue, it can be wrapped and sealed easily and does not affect the conductivity.

Referring now to FIG. 1, there is shown a flexible plastics bag with an opening facing downward, the top edge 4 and sides 5 being sealed. Flexible plastics materials can withstand the corrosive liquid exuded inside a cell during use. Many attempts have been made to use flexible plastics film to wrap and seal a dry cell, but because of its strong elastic nature, it is hard to work with during manufacture.

In another embodiment the flexible plastics bag is open along one side as in FIG. 2, the other three sides being sealed except for a small hole 6 in the lower corner of the bag where the zinc tongue will extend through. Sealing materials will be applied at 7 for the sealing of the tongue-way 7.

Figure 2A:
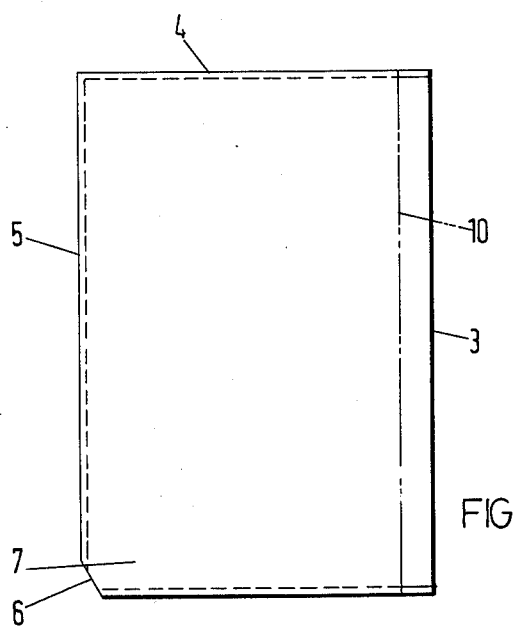
FIG. 2a shows a modification of the bag of FIG. 2 in which the hole for the passage of the tongue extending from the electrode is made by cutting off a corner of the bag.

As shown in FIG. 2a, the hole 6 may alternatively be made by cutting off a corner of the bag. Sealing materials will again be applied at 7.

In constructing the cell of FIG. 5 a piece of paper 8 which is saturated with electrolytic paste is applied to a flat piece of zinc sheet; this zinc sheet will form the negative electrode 2. The electrolytic paste can be solidified before or after the paper is applied to the zinc.

Then the zinc with the paper is rolled up to surround the depolarizing dolly 9 and so yield the active combination of the battery. This active combination is then placed inside the flexible plastics bag of FIGS. 1, 2 or 2a and the opening of the bag is sealed by heat or high frequency welding along the dotted line 10 in FIGS. 1 to 4. In actual production, we prefer to seal the hole 6 individually which the zinc tongue extends through by applying adhesive materials such as asphalt, wax, sealing wax, silicone rubber or resin at 6 and 7 to seal up the hole 6. We can also apply the above materials on both sides of the zinc tongue 1 before the active combination is placed in the soft plastics bag. After the bag is sealed by heat or high frequency welding at line 10, we only have to press the plastics bag at 6 and 7, to complete the sealing of the hole 6.

The above way of sealing has one special advantage; when the zinc electrode 2 is used up, then the corrosive liquid inside the battery will be in contact with the zinc tongue 1. If the zinc tongue 1 is not protected by the above mentioned sealing materials, the liquid will corrode away the zinc tongue 1 rapidly until liquid can escape through the hole 6. But when the zinc tongue is surrounded and protected by the sealing material, the corrosive liquid cannot attack the whole zinc tongue 1 and the leakage through the hole 6 is substantially eliminated. The same effect can be achieved by pretreating the tongue 1 with a varnish or lacquer, in which case the hole 6 may be heat sealed.

Alternatively the active combination may be enclosed in a plastics bag with a lateral opening 3 as in FIG. 2. The sealing along line 10, as of the aperture 6 and 7 in FIG. 4 is performed as described above in relation to FIG. 3. The active combination is placed in through the lateral opening in the plastics bag and the zinc tongue is extended through 6 as shown in FIG. 4.

The active combination in FIG. 3 or 4 is specially designed, and it will be seen that when the bag is sealed, the active combination is still without a carbon positive electrode.

The sealed plastics bag of FIG. 3 or 4 is then properly positioned in an outer jacket 11 (FIGS. 5 and 6). The outer jacket can be made of paper or metal or other material without consideration of corrosion caused by the liquid exuded because all the liquid will be retained inside the plastics bag. The carbon rod 12 is pressed down from the top all the way to the bottom of the depolarizing dolly 9 along its longitudional axis.

When the carbon rod 12 is driven into the depolarizing dolly 9, the volume of the dolly is bound to expand. But its circumferential expansion is limited by the bottom plate 13 which is supported by the cell assembly machine. Because the expansion of the dolly is limited in all directions the pressure exerted on the dolly by driving in the carbon rod 12 will only increase its hardness. This pressure will also be transmitted to the electrolytic paste lined paper 8 and the zinc electrode 2 so that they will be pressed against the paper or metal outer jacket and formed into the same circular shape. The driving of the carbon rod into the depolarizing dolly will also exert even pressure on all the elements from the dolly to the electrolytic paste lined paper to the zinc electrode, so that the internal resistance is reduced.

The above mentioned sealing materials are then applied around the spot 14 where the carbon rod 12 enters the depolarizing dolly 9. The zinc negative electrode 2 is backed up and supported by the outer jacket 11, so the fact that the zinc will be perforated during use will be of no consequence. Sealing of the plastics bag which contains the active combination before the carbon rod is driven into the depolarizing dolly is a noteworthy novel aspect of our invention.

When the carbon rod 12 is driven through the plastics bag at 14 into the depolarizing dolly, the adjacent area of the plastics bag will exert a certain amount of pressure on the depolarizing dolly and this will decrease the internal resistance in novel manner.

Another feature of this invention is that when the plastics bag is sealed, in our design it will transform from its flat shape into a cylindrical shape, with the result that four irregular pyramidal pockets 15 are formed two on each of the two ends of the soft plastics bag. These pockets can expand to accomodate the liquid exuded inside the battery. In order to make use of these pockets 15, we have to expel as much air as possible from these pockets before the plastics bag is sealed.

In conventional cells, the construction itself has to stand up to the ever-increasing internal pressure besides doing its function of leakproofing. The plastics bag of this invention has only to prevent the liquid from leaking out. The outer jacket 11 will resist the internal pressure. Also there are four pyramidal pockets 15 which can store the liquid exuded inside the cell so as to reduce the internal pressure; therefore, the bag itself will not burst open due to the increasing high internal pressure. The outer jacket 11 must be strong enough to stand the higher but limited inner pressure of the cell.

The sealing of the bag in this invention is a clean and simple operation; the sealing area is rarely contaminated by raw materials during manufacturing. Also, because the carbon rod 12 is driven into the enclosed and sealed depolarizing dolly 9, the top end of the carbon rod 12 is always very clean and corrosion of the metal top cover 16 due to electrolyte contamination is substantially eliminated.

After putting on the metal top cover 16 and the metal bottom plate 17, the upper and lower edges 18 of the paper outer jacket 11 are rolled inward as in FIG. 5 and a paper jacketted leak-resistant cell is completed.

If a metal jacket is preferred, two insulating cardboard or plastics rings 19 are required after the metal top cover 16 and the metal bottom plate 17 are put in place as in FIG. 6. Then the upper and lower edge 18 of the metal jacket 11 are rolled or pressed in to complete the metal jacketted leak-resistant cell of FIG. 6.

We claim:

1. A method of making a cell comprising a negative electrode in the form of a zinc tube having a tongue extending from a sidewall of the tube, the tongue being in contact with a negative terminal of the cell, a dolly and electrolyte within the tube, a sealed, flexible bag of plastic material enclosing the tube with the tongue extending externally of the bag and in sealing relationship therewith, a cylindrical jacket surrounding the tube externally of the bag, and a positive carbon electrode extending through the bag in sealing relationship therewith and into the dolly; comprising the steps of:
   a. placing the zinc tube, the dolly and the electrolyte within a soft, flexible bag of plastics material;
   b. sealing the plastics bag closed to totally enclose the tube, dolly and electrolyte, with the tongue extending externally of the bag, and including sealing the tongue relative to the bag;
   c. placing the cylindrical jacket about the tube externally of the bag;
   d. inserting the carbon electrode into the dolly through the sealed bag; and
   e. sealing the carbon electrode relative to the bag.

2. The method of claim 1 wherein the bag is provided with a relatively large opening and a relatively small opening, and wherein step a) comprises inserting the zinc tube, dolly and electrolyte into the bag through the larger opening and causing the tongue to extend outwardly of the bag through the smaller opening; and wherein the step b) is carried out by sealing the larger opening of the bag closed and sealing the tongue relative to the bag at the smaller opening area.

3. The method of claim 1 wherein the step b) of sealing the tongue relative to the bag involves the use of a pressure sensitive adhesive.

4. The method of claim 1 wherein said zinc tube is formed by rolling zinc sheet around said dolly.

5. The method of claim 1 wherein said bag is formed of a material selected from the group consisting of polyolefin materials and vinyl materials.

6. The method of claim 1 wherein said tongue and said carbon anode are sealed to said plastics bag by an adhesive material selected from the group consisting of asphalt, wax, sealing wax, silicone rubber and resin.

7. The method of claim 6 wherein said adhesive is applied to both sides of the tongue before the zinc tube is sealed to the plastics bag.

* * * * *